Reissued Aug. 25, 1942

Re. 22,166

UNITED STATES PATENT OFFICE 22,166

HARD METAL ALLOY, ESPECIALLY FOR TOOLS

Paul Schwarzkopf, Yonkers, N. Y., assignor to The American Cutting Alloys, Inc., New York, N. Y., a corporation of Delaware No Drawing. Original No. 2,122,157, dated June 28, 1938, Serial No. 743,717, September 12, 1934. Reissue No. 21,520, dated July 30, 1940, Serial No. 321,281, February 28, 1940. This application for reissue August 8, 1941, Serial No. 406,051

17 Claims. (Cl. 75—136)

This invention relates to a hard metal alloy, especially but not exclusively for tools and other working appliances.

This application forms a continuation in part of my copending application Ser. No. 727,781, filed May 26, 1934, which in turn was copending with my application Ser. No. 625,042, filed July 27, 1932 and issued into Patent No. 2,091,017, which in turn was copending with my applications Ser. No. 656,103, filed February 10, 1933 and issued into Patent No. 1,959,879, and Ser. No. 452,132, filed May 13, 1930.

It is an object of the invention to increase the hardness and toughness of such hard metal alloys.

It is another object of the invention to make such hard metal alloys applicable to uses both known so far and new ones.

It is another object of the invention to increase the resistance of such hard metal tool alloys against mechanical wear and chemical effects, such as oxidation by the surrounding air or moisture, or a cooling liquid, such as water.

It is a further object of the invention to increase the hardness of the alloy without impairing its toughness and the size of particles contained therein.

It is still another object of the invention to increase the speed at which hard alloys of this kind can be used for cutting, drilling, milling, and other machining purposes, of material which, as e. g. steel form long chips.

These and other objects of the invention will be more clearly understood as the specification proceeds.

In my Patent 1,959,879 I suggested a method of manufacturing a hard metal alloy containing mixed crystals, i. e. solid solutions of two or more carbides of different elements other than carbon selected from the third, fourth, fifth, and sixth group of the periodic system, cemented by lower melting auxiliary metal substantially taken from the iron group, and I do not claim that process in the present application.

The present invention concerns a hard composition for tool elements and other working appliances consisting substantially of hard and refractory carbide crystal structures of three or more different elements other than carbon selected from the third, fourth, fifth, and sixth group of the periodic system and auxiliary metal substantially of the iron group in amounts from about 3% to 25% by weight and wherein a substantial amount of said carbide substance forms mixed crystals, i. e. crystalline solid solutions or homogeneous carbide crystal structures each of which contains atoms of two or more different selected elements besides, of course, atoms of carbon necessary to form carbide with those elements, and the carbide crystal structures are distributed as uniformly as possible throughout the completed body.

As is well known in the art and established by experiments and science, solid solutions of two or more metals result in a product the hardness of which exceeds that of the solvent component (Jeffries and Archer "The Science of Metals," 1924, pp. 254, 407, 408). Therefore, the present invention consists particularly in a hard composition for the uses pointed out above, composed substantially of hard and refractory carbide structures of three or more different elements other than carbon selected from the third through sixth group of the periodic system and auxiliary metal essentially, i. e. completely or almost completely of the iron group, in amounts from about 3% to 25% by weight, in which at least a substantial amount of the carbide structures are compounded to form mixed crystals or homogeneous carbide crystal structures as defined above, i. e. solid solutions the hardness of which exceeds that of the solvent carbide combined in the solid solutions or homogeneous carbide crystal structures.

Although it is possible to manufacture a hard composition according to the invention in a process as disclosed and claimed in my Patent 1,959,879, it has been experienced that it is sometimes difficult to compound three or more carbides into solid solutions in substantial amount and to secure uniform distribution of all constituent elements throughout the body of the composition.

According to a feature of this invention one can successfully proceed in manufacturing such mixed crystals or solid solutions by first forming at least two pairs of solid solutions, each resulting from two selected carbides, and thereafter combining those pairs of different compositions as to carbide substances contained, into a new carbide mixed crystal. Taking for instance a carbide mixed crystal made from tungsten carbide and molybdenum carbide, and another carbide mixed crystal made from molybdenum carbide and titanium carbide, and combining them to form a new carbide mixed crystal, it will contain the three components tungsten, molybdenum and titanium, in addition to carbon required to form carbide with those components, and thereby two "binary" carbide mixed crystals have been transformed into a "ternary" carbide mixed crystal.

In the same way a binary carbide mixed crystal made from tungsten carbide and tantalum carbide, and another binary carbide mixed crystal made from molybdenum carbide and titanium carbide, can be combined to a single carbide mixed crystal which contains, however, four components, namely tungsten, tantalum, molybdenum and titanium in addition to carbon required to form carbide with the four components, and forms a "quaternary" carbide mixed crystal. The carbide mixed crystals so obtained may then be powdered to any desired degree and mixed with one or more additional carbide, if desired, and auxiliary metals as for instance cobalt, iron, nickel. The mixture so obtained is then shaped under pressure, sintered and cooled. It is believed that during sintering the auxiliary metal acts as sintering-aid and in the completed product as metal cement.

There exist several ways of explaining the surprising result of the invention, although the inventor declines to limit the invention or to base it on any theory.

According to the theory applying to mixed crystals or solid solutions of metal substances, as referred to above, the hardness of mixed crystals or solid solutions exceeds that of the solvent component substance, and consequently the hardness of solid solutions formed of three or more carbide substances exceeds that of a solvent carbide or of a simple mixture of the carbides. Also according to the theory applying to solid solutions, in a solid solution of substances of different resistance against corrosion, a substance of greater resistance protects that of lower resistance (Jeffries and Archer, ibid., page 261), and the heat conductivity of one substance to which another is added in solid solution is considerably lowered (Jeffries and Archer, ibid., pp. 246, 247 and Hume-Rothery, "The Metallic State," pp. 85 to 87).

While I have described in my Patent No. 1,959,879 a particular method of manufacturing hard metals from three or more hard and refractory carbides, it should be understood that any other method as disclosed in my earlier applications may be applied. According to that patent, a hard metal alloy is eventually obtained in which three (or more) hard and refractory carbides selected in the way stated are alloyed with an auxiliary metal and the carbides are present therein essentially or entirely in the form of solid solutions, which means that either all the carbides are combined in solid solution or at least two of them while the third is present in the alloy as a simple carbide.

Thus the three or more metals selected to form the desired carbide compounds, or even their oxides may be admixed with carbon in sufficient amount to form the desired carbide, and if oxides were introduced, to reduce the latter to their metallic state and thereafter carbidize them. The mixture preferably powdered as finely as commercially possible is heated to sintering or melting temperature, and a hard composition obtained thereby in which the desired carbide compounds and homogeneous carbide crystal structures as defined above are present. The hard composition is then ground, if necessary, to desired particle size, admixed with powdery auxiliary metal, shaped and sintered preferably between 1330° to 1600° C. for e. g. one to four hours if metal of the iron group is used as auxiliary metal.

Moreover, the three or more metals, or even their oxides, selected to form the desired carbide compounds may be admixed, on one hand, with carbon in sufficient amount so as to carbidize the elements or oxides, and, on the other hand, with the selected auxiliary metal, and the mixture preferably powdered as finely as commercially possible, heated to sintering temperature for a sufficient period of time so that a tough and hard composition results containing the desired compounds, including solid solutions or homogeneous carbide crystal structures as defined above, cemented by the auxiliary metal.

Furthermore, three or more selected carbides may be admixed with the selected auxiliary metal in finely divided state, and heated to sintering temperature for a sufficient period of time so that a cemented hard composition results, containing solid solutions or homogeneous carbide crystal structures as defined above, of the carbides in substantial amount. If metal of the iron group is used as auxiliary metal, heating to between about 1330° to 1600° C. for e. g. one to four hours is advisable.

However, any other method of manufacturing the hard and tough composition answering the invention may be used.

It is sometimes difficult to compound certain carbides in desired ratio to form solid solutions. Thus it is simetimes difficult to compound the very important titanium carbide with the desired other hard carbide, in uniform distribution. By the addition of a third carbide, such as molybdenum carbide, even in small amounts as shown hereafter, such compounding of all the constituent carbide structures and their mutual thorough permeation can readily and economically be secured.

It is not necessary, according to the invention, that the hard metal alloy contains solely carbide mixed crystals as far as the carbides present are concerned. It is satisfactory, however, for the invention if only substantial amounts of such mixed crystals are present. According to experience already about 10% of the hard metal formed by carbide mixed crystals or homogeneous carbide crystal structures as defined above, are capable of considerably improving the properties of the hard metal. If about half of the carbides present or more are transformed into such mixed crystals, a decisive improvement can be ascertained. Besides, auxiliary metal may be present in amounts of from about 3% to 25%. The amounts of mixed crystals of carbide of elements taken from the third, fourth, fifth, and/or sixth group of the periodic system may conveniently amount to at least from about 35 to 45% of the hard metal, up to about 75% to 95% of it, the remainder being formed by simple carbide of the same or other elements taken from the same or other groups of the periodic system, and auxiliary metal taken essentially from the iron group, in amounts from about 3% to about 25% by weight of the final body.

It is quite difficult to mention any minimum amounts of carbide to be present, because 5% titanium carbide occupy a space four times as large as 5% by weight of tungsten carbide. Nevertheless, the minimum amount of carbide to be present and forming part of a mixed crystal according to the invention, has to be substantial and, as a minimum, about 1% by weight of the final body.

In manufacturing the hard composition according to the particular method herein claimed, the carbides are to be chosen so that they readily form mixed crystal pairs (binary mixed crystals) and that further, the mixed crystals so obtained are capable of forming again mixed crystals, i. e. to permeate each other and to form a so-called solid solution. In the same way, the auxiliary metal is to be chosen so that the mixed crystals formed are not dissolved and separated again into their constituents or mixed crystal-constituents in any undesired and uncontrollable way, in particular leaving less than about 10% carbide solutions in the final body.

Carbides particularly usable for the invention are those of boron, titanium, vanadium, tantalum, columbium, molybdenum, tungsten. These carbides have in common the properties of being sufficiently hard and refractory, i. e. they do not decompose under the influence of water and/or air at elevated operation temperatures. Hard metals are used in the first place as tool implements for high speed work. Thereby the temperature of the hard metal and at least of its working edge is raised by several hundred centigrades and cooling water is to be applied. Therefore among all carbides of elements belonging to the third to sixth group of the periodic system only those are suitable and consequently to be chosen for the purposes of the invention which are refractory in the sense just defined and which is meant also by the use of the term refractory in the appended claims.

In practice for instance the following alloy has proven to be advantageous: About 60% to 75% tungsten carbide, in the form of $W_2C$; about 10% to 25% titanium carbide; about 1% to 25% molybdenum carbide; about 5% to 25% cobalt, nickel and/or iron. In such a mixture titanium carbide may particularly be present in amounts of from about 12% to 15%, molybdenum carbide in amounts of from about 1% to 5%. In manufacturing the hard metal alloy, first two groups of carbide mixed crystals are formed, one group containing molybdenum and tungsten, the other group titanium and tungsten, whereupon these two groups are combined to a single group of substantially ternary carbide mixed crystals, containing tungsten, titanium and molybdenum. The formation of carbide mixed crystals may be effected by heating the chosen amounts of the carbides up to from about 1600° to about 2000° C., preferably in a neutral or carbon-containing atmosphere. In the same way the ternary (and so on) carbide mixed crystals can be obtained by heating the previously obtained mixed crystals up to the same range of temperature, or a higher one, up to about 2600° C. The temperature to be applied depends on the melting temperature of the carbides themselves, on their mutual solubility, and on the time of heating. If applying the heat within a range of about 1600° to about 2000° C., a heating of from 1 to 4 hours regularly suffices. The carbide mixed crystals so obtained are then powdered and mixed with the auxiliary metal preferably powdered to about the same degree, pressed to shape and then sintering has to be done within a range of temperature of above 1330° C. up to about 1400 to 1600° C.

While any man skilled in the art can proceed to practice the invention described, there may be given, nevertheless, a few further examples of making hard metal tool alloys according to the invention.

The special tool material described hereinbefore and containing carbide of tungsten, titanium, molybdenum, and auxiliary metal taken from the iron group, may be manufactured in about the following way: 5% by weight of $MO_2C$ and 4% by weight of TiC are powdered, intimately mixed, preferably in a ball mill, for about 20 to 30 hours, and then heated up to about 1600 to about 2000° C. in a crucible and preferably by induction for about one to two hours, whereby carbide mixed crystals are obtained. About 65% by weight of $W_2C$ and about 12% by weight of TiC are powdered preferably in a ball mill for about 20 to 36 hours and then heated in the same way, up to about 1600 to about 2000° C. for one to four hours. Both kinds of mixed crystals so obtained are then intimately mixed again and powdered preferably in a ball mill by treating them for about 10 to 40 hours therein so that they are again finely divided, and heated again up to about 1600 to about 2000° C., or higher, for about one to four hours. Thereby new carbide mixed crystals are obtained comprising the elements of the two kinds of mixed crystals which have been intimately mixed together before. To this mixture is then added auxiliary metal in amounts of about 14%, consisting for instance of 13% nickel and 1% chromium. This material is once more intimately mixed preferably in a ball mill for about 4 to 24 hours, whereupon the powder so obtained may be pressed to desired shape and heated up to about 1400 to about 1600° C. for about 1 to 4 hours and cooled in any desired way, that is, rapidly or slowly, or first rapidly and then slowly, or first slowly and then rapidly.

This material will be suited to work steel and semi-steel, in a very superior way.

Another composition may be obtained from two groups of mixed crystals, one group obtained from about 8% TiC and 35% TaC, the other group from 8% TiC and 35% $W_2C$, this group of mixed crystals being manufactured in an analogous way as described before in the body of the specification, whereupon the two groups are intimately mixed and again heated up to about 1600 to 2000° C. or more, whereby new mixed crystals of them are obtained. After adding auxiliary metal, the mixture may be shaped and sintered.

Also a group of mixed crystals may be formed, however, from about 8% TiC and 10% $MO_2C$, and another group from 60% $W_2C$ and 15% $MO_2C$, whereupon these two groups are combined to form ternary mixed crystals, to which are then added about 7% cobalt as auxiliary metal. This mixture is then shaped and sintered.

Apparently, in the three examples the binary carbide mixed crystals pertaining to the two groups to be combined subsequently, present a hardness which is higher than that of the single carbide which acts as the solvent in forming the respective carbide mixed crystals. If two such carbide mixed crystals are combined to a single new one, its hardness will surpass that of the solvent carbide.

It must be understood that the invention is not limited to any examples given hereinbefore but to be derived in its broadest aspect from the appended claims.

What I claim is:

1. A cemented hard metal composition sintered by heat treatment, consisting substantially of auxiliary metal essentially of the iron group in an amount of about 3% to 25% by weight, and a hard and refractory crystalline carbide substance of at least three elements selected from the third through sixth group of the periodic system, a substantial amount of said carbide substance forming homogeneous carbide crystal structures each containing atoms of different selected elements from said groups in addition to carbon atoms.

2. A cemented hard metal composition, for tool elements and other working appliances, consisting of hard and refractory carbides of at least three different elements other than carbon selected from the third, fourth, fifth and sixth group of the periodic system and auxiliary metal substantially of the iron group in amounts of about 3% to about 25% by weight, substantial amounts of said carbides, about 10% by weight of the final body as a minimum, forming solid solutions.

3. In a hard metal as being claimed in claim 1, the carbide substance present amounting from about 75% to 95% by weight of the final body and forming homogeneous carbide crystal structures amounting from about 35% up to 75% and 95%.

4. In a hard metal as being claimed in claim 1, the major portion of the auxiliary metal being chosen from the iron group and a minor portion from the sixth group of the periodic system.

5. A cemented hard metal composition sintered by heat treatment, for tool elements and other working appliances, consisting substantially of hard and refractory carbide substance of at least three different elements other than carbon selected from the third through sixth group of the periodic system and auxiliary metal essentially of the iron group in amounts of about 3% to about 25% by weight, the minimum amount of carbide substance of a selected element to be about one percent, said carbide substance heat treated to form in substantial amount, about 10% by weight of the final body as a minimum, homogeneous carbide crystal structures containing atoms of at least two different elements selected from said groups in addition to carbon atoms.

6. A cemented hard metal composition sintered by heat treatment, for tool elements and other working appliances, consisting substantially of a hard and refractory carbide substance of at least three different elements other than carbon selected from the third through sixth group of the periodic system and auxiliary metal essentially of the iron group in amounts of about 3% to 25% by weight, a minimum amount of carbide substance of a selected element to be about one percent, said carbide substance present in finely divided state and heat treated to form in substantial amount homogeneous carbide crystal structures containing atoms of at least two different elements selected from said groups in addition to carbon atoms and thereby increasing the average hardness of the carbide substance contained in the composition.

7. A cemented hard metal composition sintered by heat treatment, for tool elements and other working appliances, consisting substantially of a hard and refractory carbide crystal substance of at least three different elements selected from the group consisting of tungsten, molybdenum, titanium, vanadium, tantalum and columbium, and auxiliary metal essentially of the iron group in amounts of about 3% to about 25%, the amount of carbide crystal substance of a selected element to be appreciable and about one percent as a minimum, and a substantial amount of said carbide crystal substance preformed by heat treatment to homogeneously contain atoms of at least two elements selected from said group in addition to carbon atoms.

8. A cemented hard metal composition sintered by heat treatment, for tool elements and other working appliances, consisting substantially of a carbide substance and auxiliary metal substantially of the iron group in amounts of about 3% to about 25% by weight, said carbide substance consisting of at least three carbides selected from a group of carbides of the elements molybdenum, tungsten, titanium, tantalum, vanadium, columbium, the minimum amount of a selected carbide to be about one percent, said carbides heat treated to form in substantial amount homogeneous carbide crystal structures containing atoms of different elements from said groups in addition to carbon atoms and thereby increasing the average hardness of said carbide substance.

9. A sintered hard metal composition for tool elements and other working appliances, substantially consisting of at least three different carbides selected from a group of carbides of the elements molybdenum, tungsten, titanium, tantalum, vanadium, columbium, and auxiliary metal essentially of the iron group in amounts of about 3% to about 25% by weight, the minimum amount of a selected carbide to be about one percent, and substantial amounts of said carbides forming homogeneous carbide crystal structures containing atoms of different elements from said group in addition to carbon atoms.

10. A sintered hard metal composition, for tool elements and other working appliances, consisting substantially of carbides of the elements titanium, tantalum, tungsten, and auxiliary metal substantially of the iron group in amounts of about 3% to about 25% by weight, the minimum amount of a selected carbide to be about one percent, and substantial amounts of said carbides, about 10% by weight of the final body as a minimum, forming homogeneous carbide crystal structures containing atoms of different ones of said elements in addition to carbon atoms.

11. A sintered hard metal composition, for tool elements and other working appliances, consisting substantially of carbides of the elements molybdenum, tantalum, titanium, and auxiliary metal essentially of the iron group in amounts of about 3% to about 25% by weight, the minimum amount of a selected carbide to be about one percent, and substantial amounts of said carbides forming homogeneous carbide crystal structures containing atoms of different ones of said elements in addition to carbon atoms.

12. In a method of producing a hard metal, for tool elements and other working appliances, from hard and refractory carbide of at least three elements other than carbon selected from the third, fourth, fifth, and sixth group of the periodic system, and auxiliary metal essentially of the iron group in amounts from about 3% to 25%, the steps of transforming substantial amounts of said carbides into at least two groups of mixed crystals, each group from different carbides, mixing substantial amounts of mixed crystals of said groups and forming from this mixture newly combined mixed crystals, and finally consolidating the mass so obtained with the auxiliary metal by treatment at elevated temperatures up to about 1400° to 1600° C.

13. In a method of producing a hard metal, for tool elements and other working appliances, from hard and refractory carbides of at least three elements other than carbon selected from the third, fourth, fifth, and sixth group of the periodic system, and auxiliary metal essentially of the iron group in amounts from about 3% to 25%, the steps of transforming by heat treatment at above about 1600° C. substantial amounts of said carbides into at least two groups of mixed crystals, each group from different carbides, mixing substantial amounts of mixed crystals of said groups and forming from this mixture newly combined mixed crystals by heat treatment at above about 1600° C., and finally consolidating the mass so obtained with the auxiliary metal by treatment at elevated temperatures up to about 1400° to 1600° C.

14. In a method of producing hard metal, for tool elements and other working appliances, from at least three hard and refractory carbides of elements other than carbon selected from the third, fourth, fifth and sixth group of the periodic system and auxiliary metal essentially of the iron group in amounts from about 3% to 25%, the steps of transforming substantial amounts of said carbides into at least two groups of mixed crystals, each group from different carbides, mixing substantial amounts of mixed crystals of said groups and forming from this mixture newly combined mixed crystals, adding thereto a substantial amount of at least one of said carbides and auxiliary metal, and finally consolidating the mass so obtained by treatment at elevated temperatures up to about 1400° to 1600° C.

15. In a method of producing hard metal, for tool elements and other working appliances, from hard and refractory carbides of at least three elements other than carbon selected from the third, fourth, fifth and sixth group of the periodic system and auxiliary metal essentially of the iron group in amounts from about 3% to 25%, the steps of transforming substantial amounts of said carbides into at least two groups of mixed crystals, each group from different carbides, mixing substantial amounts of mixed crystals of said groups and forming from this mixture newly combined mixed crystals by heat treatment at above about 1600° C., adding thereto a substantial amount of at least one of said carbides and auxiliary metal, and finally consolidating the mass so obtained by treatment at elevated temperatures up to about 1400° to 1600° C.

16. In a method of producing a hard metal composition, for tool elements and other working appliances, the steps of preforming by heat treatment at temperatures above 2000° C. and up to about 2600° C. a hard and refractory carbide crystal substance of at least three different elements other than carbon selected from the third through sixth group of the periodic system so as to contain therein substantial amounts of homogeneous carbide crystal structures comprised of atoms of at least two different elements selected from said groups and carbon atoms, comminuting and intimately admixing said carbide substance with about 3% to 25% by weight powdery auxiliary metal essentially of the iron group, and sintering the mixture at temperatures up to about 1400° C. to about 1600° C., so as to obtain a substantially dense and tough body.

17. In a method of producing a hard metal composition, for tool elements and other working appliances, the steps of preforming by heat treatment at temperatures above 1600° C. and up to about 2600° C. a hard and refractory carbide crystal substance of different elements other than carbon selected from the third through sixth group of the periodic system so as to contain therein substantial amounts of homogeneous carbide crystal structures comprised of atoms of at least two different elements selected from said groups and carbon atoms, comminuting and intimately admixing said carbide substance with about 3% to 25% by weight powdery auxiliary metal essentially of the iron group, and a substantial amount of a carbide crystal substance of at least one element selected from said groups so that the mixture always contains at least three different selected elements, and sintering the mixture at temperatures up to about 1400° to about 1600° C., so as to obtain a substantially dense and tough body.

PAUL SCHWARZKOPF.